United States Patent
Rodrigue et al.

(10) Patent No.: US 8,340,807 B1
(45) Date of Patent: Dec. 25, 2012

(54) RAPID PRODUCTION TURNKEY SYSTEM AND RELATED METHOD

(75) Inventors: Rodney P. Rodrigue, Longwood, FL (US); Alfredo Stimac, Altamonte Springs, FL (US); Christopher Lallier, Melbourne, FL (US)

(73) Assignee: Time Wise Solutions, LLC, Morrill, ME (US)

( * ) Notice: Subject to any disclaimer, the term of this patent is extended or adjusted under 35 U.S.C. 154(b) by 614 days.

(21) Appl. No.: 12/476,530

(22) Filed: Jun. 2, 2009

Related U.S. Application Data

(63) Continuation-in-part of application No. 12/016,713, filed on Jan. 18, 2008, and a continuation-in-part of application No. 11/106,279, filed on Apr. 14, 2005, now Pat. No. 7,747,470.

(51) Int. Cl.
*G06F 19/00* (2011.01)

(52) U.S. Cl. .......... 700/182; 700/159; 700/117; 700/95; 700/103

(58) Field of Classification Search .......... None
See application file for complete search history.

(56) References Cited

U.S. PATENT DOCUMENTS

| | | | |
|---|---|---|---|
| 4,916,293 A * | 4/1990 | Cartlidge et al. ............. | 700/159 |
| 5,266,878 A * | 11/1993 | Makino et al. ............... | 700/159 |
| 5,659,478 A * | 8/1997 | Pennisi et al. ................ | 700/95 |
| 6,112,133 A * | 8/2000 | Fishman ....................... | 700/182 |
| 6,123,312 A | 9/2000 | Dai | |
| 6,470,225 B1 * | 10/2002 | Yutkowitz .................... | 700/44 |
| 6,671,572 B1 * | 12/2003 | Craft et al. ................... | 700/180 |
| 6,704,611 B2 * | 3/2004 | Coleman et al. ............. | 700/186 |
| 6,735,489 B1 * | 5/2004 | Khurana et al. .............. | 700/95 |
| 6,775,585 B2 * | 8/2004 | Bedont et al. ................. | 700/182 |
| 6,907,313 B2 * | 6/2005 | Matthews et al. ............. | 700/182 |
| 7,058,472 B2 * | 6/2006 | Mathews et al. ............. | 700/182 |
| 7,216,092 B1 | 5/2007 | Weber | |
| 7,451,013 B2 * | 11/2008 | Coleman et al. ............. | 700/173 |
| 7,526,359 B2 * | 4/2009 | Landers et al. ............... | 700/182 |
| 8,041,445 B2 * | 10/2011 | Suh et al. ...................... | 700/160 |
| 8,050,789 B2 * | 11/2011 | Elhanan et al. ............... | 700/121 |
| 2003/0040834 A1 * | 2/2003 | Coleman et al. ............. | 700/191 |

(Continued)

OTHER PUBLICATIONS

AS9100store.com, "AS9102 Frequently Asked Questions", 2009, obtained on the Internet [www.as9100store.com/what-is-AS9102-first-article-inspection.aspx] on Dec. 1, 2011.*

(Continued)

*Primary Examiner* — Mohammad Ali
*Assistant Examiner* — Kelvin Booker
(74) *Attorney, Agent, or Firm* — Verrill Dana, LLP; Chris A. Caseiro

(57) ABSTRACT

A system and related method providing a turnkey arrangement for the rapid production of parts using one or more CNC machines. The system includes a set of functions arranged to generate a rapid production technical data package that may be used by the manufacturer to fabricate a part quickly, efficiently and accurately. The package includes a First Article inspection certificate, a three-dimensional solid model, setup and process instructions, G and M Post codes, holding fixtures, cutting tools and revision control. The method includes steps leading to the creation of the rapid production technical data package. The steps include the gathering of part information, populating a database with CNC machine information, including Post codes, designing manufacturing instructions using a single CAD/CAM platform, integrating model and fixture information to generate a Smart Part model for any CNC machine, establishing Post codes for all CNC machines in the database, and proving out the model.

16 Claims, 3 Drawing Sheets

U.S. PATENT DOCUMENTS

| | | | |
|---|---|---|---|
| 2004/0143362 A1* | 7/2004 | Matthews et al. | 700/182 |
| 2004/0267508 A1* | 12/2004 | Huang et al. | 703/7 |
| 2005/0049883 A1 | 3/2005 | Boroson | |
| 2005/0071121 A1* | 3/2005 | Kappel | 702/155 |
| 2005/0113962 A1* | 5/2005 | Matthews et al. | 700/182 |
| 2006/0129270 A1* | 6/2006 | Pankl et al. | 700/182 |
| 2006/0129461 A1* | 6/2006 | Pankl et al. | 705/26 |
| 2006/0129462 A1* | 6/2006 | Pankl et al. | 705/26 |
| 2006/0235706 A1 | 10/2006 | Rodrigue | |
| 2007/0073587 A1* | 3/2007 | Walker et al. | 705/14 |

OTHER PUBLICATIONS

Business Editors and High Tech Writers (Aug. 8). Autodesk Inventor Beats SolidWorks in Independent 3D Mechanical Design Software Competition; Head-to-Head Shoot-Out Confirms Superiority of Autodesk Inventor. Business Wire, 1. Copies of three pages from Notice of References Cited in U.S. Appl. No. 11/206,279. Business Dateline database Document ID: 147483361.

* cited by examiner

RAPID PRODUCTION TURNKEY SYSTEM AND RELATED METHOD

CROSS REFERENCE TO RELATED APPLICATION

This application is a continuation-in-part of, and claims the priority benefit of, U.S. application Ser. No. 12/016,713 filed Jan. 18, 2008, entitled "System and Method to Improve Supply Chain Resources" and U.S. application Ser. No. 11/106,279 filed Apr. 14, 2005, entitled "System and Method to Improve Manufacturing." These applications are owned by a common assignee. The contents of these two applications are incorporated herein by reference.

BACKGROUND OF THE INVENTION

1. Field of the Invention

The present invention relates to systems and methods designed to maximize the efficiency of manufacturing products. More particularly, the present invention relates to a turnkey system for relating product design information to manufacturing capabilities across a range of manufacturers and manufacturing equipment. The present invention relates to systems and methods to enable manufacturers to optimize productivity.

2. Description of the Prior Art

Goods manufacturers have long been the driving force of much of the country's economy. This community is competing in world markets and must strive for benchmarking goods and services as "best in class." One type of manufacturer of interest in regard to the present invention is the machined component parts manufacturer, although that is not a limitation of the present invention. This type of manufacturer generally uses processes involving the machining and fabrication of metals, sheet metal, and composite materials based upon customer specifications. Machining companies must be prepared, equipped and trained to produce a wide variety of precision parts for companies that design and assemble guidance systems, space communications devices, navigation equipment, pressure vessels, and advanced medical devices, among many others.

However, a competitive global market and substantial pressure to reduce pricing has produced considerable challenge for today's manufacturers. Specific challenges small and medium manufacturers are facing include:

Aggressive competition from the European Market, Mexico and Southeast Asia
  Aging ownership of companies without transition plans
  Contraction of supply chain options
  Stringent supply chain requirements for quality, delivery and cost
  The nation's changing demographic that is forcing large companies to diversify their supply chains to reflect their customer base As a result, there has been a substantial decline in the number of such businesses and, relatedly, the number of people employed in this traditional manufacturing sector. As indicated above, the machining sector includes, generally, those organizations that build the parts that go into end-use products, from aircraft to motor vehicles. That job loss may have a detrimental effect on the country's future ability to manufacture supplies that it needs. Further, it may widen existing income gaps between service sector and manufacturing sector jobs, increase competition for low-skill jobs, and reduce the manufacturing sector's competitive edge as the aging skilled workforce is not replaced.

The competition for manufacturers involved with private (commercial) and public (government, including defense) customers is increasing dramatically, even after many years of contraction of prime and second-tier manufacturers in the defense industrial base. Over approximately the last 25 years, the number of US-based Small to Medium Enterprise (SME) defense industry manufacturing suppliers has been reduced from 130,000 to 30,000 due to, among other things, mergers and acquisitions by major defense contractors. That contraction has resulted in the direct and indirect elimination of more than two million jobs in the defense sector. In addition, the associated pricing pressures have produced the effect of extending the necessary useful life of many product types, including critical weapon systems, not only because of order reductions, but because of reduction in research and development spending and the procurement of fewer new products. For example, many aircraft in the current operational Air Force are more than 20 years old. Those and other defense systems are expected to be useable for much longer periods of time, while the availability of replacement parts for those systems diminishes as the number of replacement parts required drops over that time period while remaining a critical need to ensure that the system at issue remains viable for its expected service life.

Most Prime (direct contractual relationship with the customer) and Original Equipment Manufacturing (OEM) contractors have recognized these pressures and are defining new strategies that will dramatically change the requirements for the supply chain and suppliers within that chain. For example, the aerospace and defense and commercial Primes and OEMs are transforming themselves from original manufacturers into final assemblers in response to:

increased competition in both commercial and defense sectors;
  downward cost pressures from the Department of Defense increased outsourcing to foreign suppliers The reconfiguration requires $1^{st}$ Tier suppliers to manage the bulk of the supply chain and requires $2^{nd}$ and $3^{rd}$ Tier suppliers to convert their operations to high mix/low volume production and upgrade the skill sets of their production workers.

This country's SME manufacturers have been the foundation for many industry manufacturing supply chains. Yet, many SME manufacturers face significant barriers that prevent them from participating in the supply chains of today, and certainly of tomorrow. These barriers include complex legal and financial bid requirements; a lack of access to technology; the lack of a skilled workforce; the lack of an innovation culture; and the lack of a culture to strive for "continuous improvement." Other significant barriers include the inability of the workforce to read and/or translate technical data packages into shop floor level manufacturing specifications and proper pricing and shortage of skilled workers. In general, it is becoming increasingly difficult to compete effectively in the manufacture of products as such products become more sophisticated, require the use of complex design and manufacturing tools, are the subject of variations in their design and manufacture, and the workforce becomes less capable of matching the equipment design and operation sophistication.

In order to assist manufacturers of any size to rapidly respond competitively to product manufacture requests, what is needed is a system and related method to enable them to generate or obtain effective technical data packages and have the ability to carry out the steps necessary to perform in a timely and cost effective manner. Unfortunately, most manufacturing supply chains are vulnerable to interruption to some degree due to a range of limitations to be described herein.

Anywhere along that chain, the manufacturer may be prone to a switch from a profitable operation to a manufacturing nightmare. For example, manufacturers with Computerized Numerical Control (CNC) manufacturing machines use high quality mechanical and electronic components to produce precision parts to the required specifications, and they require control instructions established by software programs to establish the proper operation sequence (process), tool path, travel rate, rotational speed and direction, and any number of other detailed part or tool manipulations. Any of the steps carried out along the way from initial product design to fabrication completion may be subject to error.

It is to be noted for the purpose of describing the present invention that, in general, there are two basic steps to creating an actionable CNC program under current manufacturing methods:

1. Development of the process plan (sequence of operations); and
2. Generation of the computer programming codes that are tool path codes based on part geometry and sequence of operations, an example of which is commonly referred to in the manufacturing community and herein as the G-code used to control numerically controlled and CNC machine tools as developed by the Electronic Industries Alliance.

Individual manufacturers tend to create their own CNC programming codes suitable for their own machines in their own facilities. In general, those codes cannot be translated for use on different machines located in different facilities. Therefore, if that particular manufacturer is no longer available as a supplier, the production of the product using the proprietary G-codes must be re-created in a new facility with different CNC machinery. That can be an acute problem for others in the supply chain leading to the product consumer.

The current process for designing and manufacturing parts using CNC machining has a variety of limitations identified above and noted herein in greater detail. Those limitations can generally be characterized as falling into the following specific categories: 1) purchasing issues; 2) installation issues; 3) design issues; 4) holding fixture issues; 5) conversion issues; 6) process planning issues; 7) machine coding and language issues; 8) Posting issues; and 9) prove out issues. Each limitation will be described in turn.

There is an inherent lack of communication between purchasing agents and shop floor personnel. This lack of communication involves, but is not limited to, what type of machine, tool orientation or axis, tooling to employ with the machine, machine options suitable for the manufacturing project and so forth. That is, each participant may have a specific opinion about how best to approach the task. Each suggestion may have merit but the bottom line is that this uncertainty and impingement on decision making slows the manufacturing process and tends to lead to customized problem solving. Further, this communication problem can obscure the function of purchasing the right equipment for the project, resulting in further delays related to equipment purchase lead time requirements. Moreover, the uncertainty can result in the decision to acquire a machine considered suitable without an effective evaluation as to whether existing tooling otherwise considered inefficient will suffice for the project. Finally, CNC machine code files, which is, in effect, software, often must be purchased in a form that is compatible with the coding structure of the machine or machines at the shop, regardless of any original coding that may have been associated with the manufacturer of the part, including any proprietary coding structure (referred to herein as the Post code). Unfortunately, there may be compatibility issues between the purchased Post code and the required machine configuration.

When a machine is purchased for the purpose of carrying out a particular manufacturing project, that machine is setup using the supplier's installation schedule. That schedule may or may not be compatible with the manufacturer's needs. In addition, the machine's operating parameters, including its controller configuration are ordinarily pre-set at the factory. That configuration may be inaccurate or incompatible and is generally not checked by the installer. Further, safety barriers on the machine may not be properly checked to fit the manufacturer's needs. Other common problems associated with an initial machine purchase that lead to delays in the installation portion of the overall process of moving from a product order to its manufactured completion include, but are not limited to, different delivery times for machine parts, power supply delays and compressed air installation delays.

The manufacture of complex and other parts using sophisticated CNC machines requires substantial design skills. Many company design staff, whether trained engineers, inexperienced interns or high school graduates, particularly at small and medium enterprises, lack the knowledge and understanding of CNC operations and full CNC machine capabilities. As a result, the Computer Aided Design (CAD) portion of the overall manufacturing process may be delayed as design staff gain sufficient understanding of the CNC equipment. Even then, the designers tend to model the desired part incorrectly leading to design geometries that are incompatible with CNC machine functions. Correcting those errors causes a delay in the process. In addition, most available CAD models are not designed to generate manufacturing configurations that are compatible with existing CNC machine configurations. This forces Computer Aided Manufacturing (CAM) programmers on the shop floor tasked with programming the manufacturing machine to re-create a compatible CAD model before proceeding with CAM programming. In some instances, the "on-the-fly" configuration changes that result from the inconsistency between CAD and CAM may not be saved for future reference, leading to the possibility of a repeat of the same delayed design correction process.

An important aspect of the product machining process is the holding fixture or fixtures used to retain a work piece in position during the machining process. These holding fixtures and related tooling usually are not included in the technical data package. That is not particularly unusual as the technical data package ordinarily is not specific to that level of detail. Any fixtures that may be called out are as likely as not to be outdated for the selected CNC machine. Further, any fixtures that might be called out in a technical data package may be disregarded because their associated controlling programs are incompatible with the control arrangements for the CNC machine to be used. Manufacturers may attempt to address their holding fixture needs for a project by attempting to retrofit old fixtures to conform to new fixture needs. That effort alone requires additional tooling for the fixture retrofit and extends the time associated with this step of the entire manufacturing process. As with other stages of the existing manufacturing process, the holding fixture stage often involves customized one-time efforts and the records of the fixture making and/or selection process are not maintained. As a result, that "learning" is not transferred, either within that facility or manufacturer or to another manufacturer who may have an interest in acquiring it. Finally, a manufacturer may settle on a holding fixture arrangement for a particular part or set of parts and never deviate from that arrangement, thereby avoiding the opportunity to make improvements to enhance machine compatibility and/or increase the efficiency of the fabrication process. Both of these effects will lead to delays in the optimal manufacturing process.

As noted earlier, an aspect of the fabrication process is the conversion of control files supplied in a technical data package into coding suitable for use with the particular CNC machine selected for the task. Initially, conversions are made, often without checking for errors in the original files, such as unintended geometry errors, before making the conversion. The errors thus are converted to create post codes that are wrong. Further, the coding errors that may be translated may also extend to the corresponding features and tolerances for other related tooling and tool paths during the CAM process. These features and tolerances and their related programming may therefore also require correction. Moreover, the native programming codes are generally modeled to process the part production at either the high end or the low end of a specified tolerance range. That is, they are not normalized to a midrange of the tolerance. This may result in production of multiple parts that provide no leeway for tolerance ranges of other parts that should be coupled to the manufactured part. If the machine codes are instead provided based on middle of the tolerance scale geometries, fewer finished part errors are likely to occur. Finally, in some instances, the CAD models of the technical data package imported into the Post coding are not accurately convertible, resulting in an incomplete or corrupted machining model. They must then be reconfigured or the process started from scratch to address the resulting errors. This, too, is a delay in the overall fabrication process.

The traditional manufacturing process plan often calls for the use of too many machines and too many setups. That is, an optimal manufacturing process will involve the use of only enough CNC machines necessary to make the part and only enough tool switch-outs to complete the manufacture, no more and no less. The use of extra machines and extra setups causes delays in the overall process. Further, present processes have delays resulting from the selection of the wrong fixtures and tools. Moreover, in many plants, there is insufficient interaction between the machine programmers and the fixture and tooling personnel. As a result, machine crashes may occur due to poorly designed fixture clearances.

The array of CAD and CAM programs is wide and variations can occur within the same organization. These variations can happen due to differences in CAD platforms employed to generate CAD programs, and differences in CAM platforms and programs used to generate G and M Post codes for CNC machine control. It can be seen, then, that computer program and coding differences across platforms, across departments of an organization and between functions may slow the manufacturing process at a minimum, and cause substantial errors in the manufacture of a part. The CAM programmers may be restricted by existing fixture design geometries and/or incorrect part model geometry received from the CAD programming when they program the CNC machines. Nevertheless, while they may note that G and Mo coding instructions they receive from the CAD programming may not be applicable for the machines in use, they must still proceed with those Post codes. This process of incompatible functions and restrictions on programming corrections delays the manufacturing process.

Once the process plan has been generated for the manufacture of a part, tooling and fixture files designated by the created CAD program is imported into a CAM program to generate a "smart" model of the part, which is the CAD part model with attached CAM data used to "prove out" the manufacture of the part on the designated CNC machine or machines. Next, Post coding is initiated to generate G and M codes for the CNC machine selected to prove out the CAD/ CAM model. Based on the model and G and M codes, it may be necessary to acquire or produce special tooling and/or fixtures to ensure the proper setup for the prove out machine. This stage of the manufacturing process may be slowed substantial by the need to create custom tooling and/or fixtures. In addition, there may be Post coding and prove out related delays.

In regard to Post coding problems at the prove out stage, it is to be noted that the people on the floor assigned to program the CNC machine must choose the correct machine controller Post code—if included in the CAM Post library provided by the CAM programmer. Otherwise, the machine programmer may have to modify existing Post codes to meet those controller configurations. If commercial Post writing software is employed for the machine, those manual modifications made by the machine programmer that third-party Post writing software may automatically make changes to those manual modifications, or the manual modifications may carry through all Post writing generated by the third-party software. The manual changes may not be sufficient or complete. These modifications and any inconsistencies with respect to the third-party Post writing software may result in CNC machine errors and, possibly, crashes. These errors and delays slow the prove out process.

In addition to the Post coding difficulties that may be experienced in the prove out of suitable CNC machine operation for part production, there are often difficulties at the machine. One delay results from the setup person at the machine seeking to interact with the CNC programmer to discuss adjustments that he/she observes are required. Alternatively, the setup person may simply make the changes without providing any feedback to the CNC programmer. Upon that occurrence, a revision change is not carried back through the CNC, CAM or CAD programming, leading to the misperception that the designated programming is satisfactory. Backups of machine programs revised are often not made. Therefore, any setup changes that were made that corrected a discovered problem must be repeated on the next run of parts using that machine and the original CNC program. Ultimately, the setup person has substantial impact on the efficiency of the process as that person installs all fixtures and tooling, loads the CNC control program and activates a dry run. The setup person runs a single part, may make further machine adjustments to bring the part into tolerance and to machine the part properly. As often as not, machine crashes will occur from operator error, which delays the manufacturing process.

The prove out stage of the manufacturing process may take months under the current manufacturing process. That delay slows company productivity and idles an array of employees. Eventually, when a part manufacture process has been proven, the process plan and the G and M codes written are specific to the single machine where the prove out occurred, changes made may not have been documented adequately, and the process established is not easily transferred to other machines, particularly those with different controllers. Therefore, the existing process may continue production delays even when at the production stage after prove out has, in theory, been completed.

The current CNC machine fabrication processes can take anywhere from two to 10 months from initial part fabrication conception to production ready. That time frame is unacceptable in today's economic environment, where efficiency is of substantial importance. What is needed is a system and related method to substantial reduce the manufacturing preparation process. Further, what is needed is a system and related method to make compatible an array of CAD and CAM programming options, Post coding and available CNC machines and machine setups so as to substantial minimize or eliminate the errors inherent in the use of different devices to get to production readiness.

SUMMARY OF THE INVENTION

It is an object of the present invention to provide a system and related method to provide parts manufacturers with a complete package of designs and machine operation codes to reduce substantially the time required to design and make machined parts. It is also an object of the present invention to provide a system and related method to make compatible an array of CAD and CAM programming options, Post coding and available CNC machines and machine setups so as to substantial minimize or eliminate the errors inherent in the use of different devices to make accurate parts in desired quantities.

These and other objects are achieved with the present invention, which is a turnkey system and related method for the complete design and manufacture of parts. The present invention may be used by any manufacturer, with any existing CNC machines, using programming codes recognizable by the manufacturer, regardless of part design origin. The system resolves the limitations associated with the prior fabrication process. A team approach is applied to purchasing so as to minimize unwarranted purchases and delivery delays. The system provides a standardized mechanism for manufacturing design by selecting the best form-to-function fit, focusing on best manufacturability practices, and is customizable to conform with a particular manufacturer's shop floor machining capabilities. In addition, it is configured to ensure that any revision control requirements are maintained by the manufacturer. The system enables the check and confirmation or correction of factory pre-set controller codes to ensure design instruction compatibility. It also permits the user to check automatically for safety barrier activation and proper functioning, and any initial controller parameters are saved and arranged to enable reset thereto if deemed necessary. Optionally, the system may include controller parameters that are compatible with other supply chain related systems, such as the SupplyPoint® macro parametric programs available from the present assignee, but not limited to such programs. These features substantially reduce the delays associated with the purchasing, installation and design limitations described above.

The turnkey system of the present invention provides: 1) a first article inspection certificate; 2) a process plan that has been proven out in advance; 3) machine-specific work holding fixtures adaptable to an array of similar machine configurations; 4) if needed, cutting tools to produce the part; and 5) a revision control mechanism.

The present invention not only provides an advantage in the certainty of part production, it ensures that accurate and reliable manufacturing of that part may be repeated in the future and across different machines. The turnkey package that is provided is archived securely so that it may be retrieved when desired. The package is automatically updated with advances in CNC technology and any Technical Data Package changes. The system is arranged to enable the manufacturer to access updated G and M Post codes through receipt of reprogrammed Technical Data Packages, as well as updated setup and process instructions for the operator, which setup and process instructions may also be specifically customized to ensure that the instructions and codes are compatible with the particular manufacturer's operations. The system may be substantially a computer-based and software-based system so that Technical Data Package updates may be downloaded, directly or indirectly to one or more computing devices of interest, such as through the internet.

The system of the present invention includes a single CAD/CAM platform for machine operation design, thereby eliminating the delays and errors associated with multiple responsible participants and multiple design platforms. It also ensures the use of best currently available machine program design and technology and best practices are employed, without the manufacturer bearing the entire burden of ensuring that it is completely up-to-date and as efficient as possible. The system provides the capability to implement CAD/CAM program conversions, such as through reverse engineering, the importation of 3D solid model files, regardless of format, and all sorts of part design geometry confirmation including, but not limited to, manual geometry checks to ensure that part characteristics inserted into the design phase are accurate. The system also supplies, or provides information the manufacturer may use to obtain, fixtures and tooling that are best fit for the project. This results in the best machining possible, the minimum number of setups required, designation of the most effective CNC machine(s) for the project, and most productive part holding methods. Optionally, the system may provide custom-designed fixtures adaptable to fit any machine configuration of interest, dependent upon manufacturer desires and culture.

The present invention includes one or more databases to retain all information generated and gathered related to the manufacturing process from initial idea to production readiness. The database is configured to maintain customer revision control requirements and a complete catalog of CNC machines by type, model, controller type, number of axes, tools and speeds, but not limited thereto. The database is updated regularly automatically or manually. The database may be maintained centrally or in a distributed manner. It is preferable that it be acceptable to a limited number of people, but the invention is not limited in that regard. The database also provides access to programs that enable automatic feature recognition for stored parts, automatic tool selection, Post processing files for thousands of combinations of CNC model-controllers and Post processing capability for any CNC machine. The database also includes embedded advanced macro parametric scripts at least for: 1) minimizing crashes and preventing machine operator editing; 2) coolant and pallet checks; 3) enabling the inclusion of multiple parts to manufacture on the same controller program; 4) monitoring of tool loading and conveyor check; 5) in-process inspection with automatic probe routines; 6) automatic machine maintenance reminders; 7) synching of machine cycle time with CNC controller clock; and 8) run-time optimization, enabling reduced CNC controller memory use.

The database can be used to ensure that any G and/or M Post machine codes are generated accurately for whatever CNC machine configuration recommended by the Technical Data Package designed by the system or, alternatively, selected by the manufacturer based on its particular interests. The system also permits embedding of customized parametric scripts similar to those standardized ones listed in the preceding paragraph. Upon completion of the CNC machine setup using the program controls provided, the system is arranged to enable prove out to be completed using standardized equipment intended for that purpose to check for machine crashes and to make any necessary tool and/or programming adjustments. The first part manufactured at prove out is then tested to Gold standard. As a result, the manufacturer is assured that use of the packaged programming for G and/or M coding will result in the fabrication of a part meeting all requirements for geometry and tolerances.

The turnkey system and related method of the present invention ensure a team approach to CNC purchasing decisions. It ensures that accurate machine, fixture and tooling installation occurs and that error checks are performed for machine controller parameters and safety barriers. The system and method are arranged for best efficiency and productivity of a manufacturer's CNC machines and to reduce setup, cycles, lead times, machine crashes and program and/or operator errors. The invention uses a single CAD/CAM design approach to generate part-specific rapid production turnkey Technical Data Packages for single or multiple part production, at any volume, on multiple CNC machines, if desired. The invention eliminates artificial barriers associated with multiple departments, positions and CAD and/or CAM platforms.

The system and related method ensure that all designs are focused on manufacturability considerations. The system involves the use of the most current available machine programming and best practices. It can provide first article testing and production of a Gold part for each validated rapid production turnkey Technical Data Package. The database of the invention provides for electronic archiving validated rapid production turnkey Technical data Packages for future reference and on-demand production on any manufacturer's CNC machine. This turnkey system allows for access to an inefficiently used capacity of the network of CNC machines that exist, which is particularly valuable to address any need for rapid production of machined parts when there is a surge in demand. This mechanism for design uniformity, flexibility and ensured storage of cumulative memory provides insurance against supply chain disruptions for legacy and future parts during any critical condition. It also minimizes obsolescence and backorder delays. It further reduces the need and cost to maintain a large inventory of machined replacement parts. Finally, it ensures a manufacturer, particularly a prime contractor, but not limited thereto, satisfies the requirements of Sarbanes Oxley for second sourcing and disaster planning. These and other advantages of the present invention will become apparent upon review of the following detailed description, the attached drawings, and the appended claims.

DETAILED DESCRIPTION OF THE PREFERRED EMBODIMENT

Figure 1:
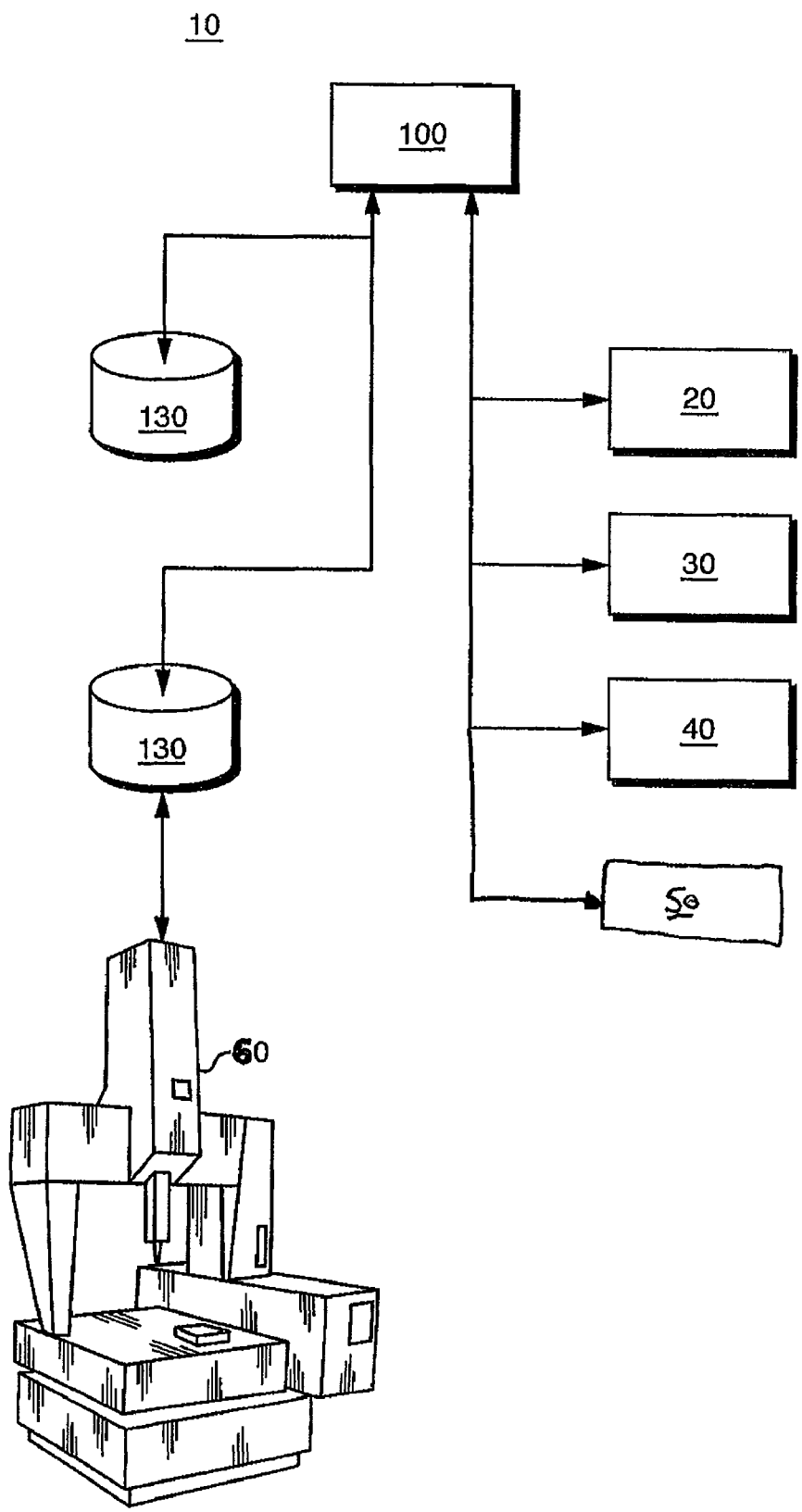
FIG. 1 is a block diagram of the functional elements of the system of the present invention.

As represented in FIG. 1, the present invention is a turnkey rapid production system 10 and related method to enable an array of manufacturers using an array of fabrication machines to produce parts in a timely and cost-effective manner. The system 10 includes a design function 20, a fixtures and tooling function 30, a machine selection function 40 and a rapid production technical data package 50. A computer system 100 is preferably used as the means by which the functions described herein, along with one or more databases 130, store, query and exchange information and translate, for example, stored CNC machine and machine controller coding instructions into one or more other CNC machine and machine controller coding instructions. One or more of the identified functions may be established as discrete components, or parts of one or more common components. They may be coupled together as module components in any combination of hardware, firmware, software, microcode or any combination thereof.

The design function 20 is configured to receive product information and to modify, amend and/or add to such information, and to transmit product manufacturing information consistent with product fabrication capabilities. Those skilled in the art will recognize that the design function 20 may be configured for any type of information exchange, whether by direct manual input or automated information exchange, such as by local or remote network communication, including by internet connections among a plurality of information providers and users. The fixtures and tooling function 30 is configured to receive fixture and tooling information, and to modify, amend and/or add to such information, and to transmit such information for use in product manufacturing. The machine selection function 50 is configured to receive CNC machine information, and to modify, amend and/or add to such information particularly in relation to the other two functions and the end goal of fabricating a product of interest, and to transmit such information for use in product manufacturing. The rapid production technical data package 50 is a compilation of instructions and information, in the form of software but not limited thereto, supplied to a manufacturer with gathered information and generated instructions to be used in the production of a part of interest. The output of the package 50 is directed to the computer system 100 for subsequent transmission of design and machine programming instructions to a CNC machine, such as the machine generally represented as machine 60 of FIG. 1. The information transmitted in association with the operation of the machine 60 includes, but may not be limited to, CAD drawings, bill of materials, tool crib instruction requirements, translated computer programming codes suitable for the operation of the machine 60, and setup and machine operation instructions for the fabrication of the product of interest.

Figure 2:
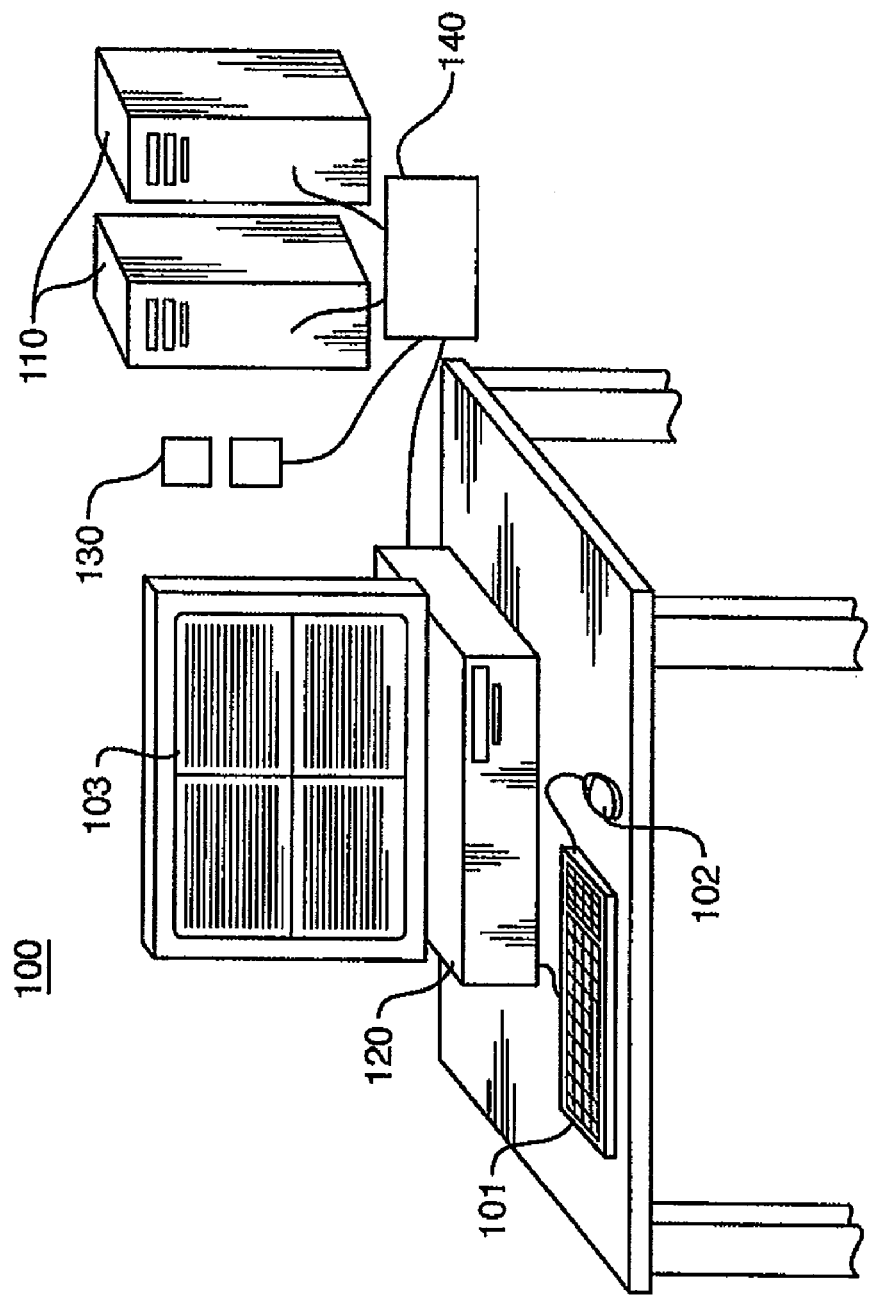
FIG. 2 is a simplified diagrammatic representation of an example computing system including the turnkey rapid production response system of the present invention.

As illustrated in FIG. 2, a manufacturer that selects the system 10 for the purpose of fabricating a part in a cost efficient and timely manner may engage the system through the computer system 100, which may be associated with local or remote computing means, such as one or more central computers, such as server 110 in a local area network, a metropolitan area network, a wide area network, or through intranet and internet connections. The computer system 100 may include one or more discrete computer processor devices, represented by desktop computer 120, for example. The computer system 100 may include computer devices operated by a centralized administrative entity, such as a provider of supplier resources information, one or more manufacturers (i.e, desktop, laptop, servers, and even CNC machines), and/or one or more providers of supplier services.

The server 110, the computer processor 120, or a combination of both may be programmed to include one or more of the functions of the system 10. One or more databases represented by database 130 that may be associated with the server 110, the computer processor 120, other computing devices, or any combination thereof, include information related to the use of the system 10. For example, the database 130 may include information regarding automatic part feature recognition, automatic tool selection, Post processing files, Post processing capabilities and embedded macro parametric scripts, for example. The database 130 may be populated and updated with information provided by an application provider capable of carrying out one or more of the steps associated with the operation of the system 10, one or more manufacturers, or any other information providers. All of the devices may be interconnected through one or more signal exchange devices, such as router/switch 140.

The computer processor 120 and interactive drives, memory storage devices, databases and peripherals may be interconnected through one or more computer system buses. The system buses may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system 100 typically includes a variety of computer readable media. Computer readable media can be any available media that can be accessed by computer system 100 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer system 100.

The computer system 100 further includes computer storage media in the form of volatile and/or non-volatile memory such as Read Only Memory (ROM) and Random Access memory (RAM). RAM typically contains data and/or program modules that are accessible to and/or operated on by computer processor 120. That is, RAM may include application programs, such as the functions of the system 10 of the present invention, and information in the form of data. The computer system 100 may also include other removable/non-removable, volatile/non-volatile computer storage and access media. For example, the computer system 100 may include a hard disk drive to read from and/or write to non-removable, non-volatile magnetic media, a magnetic disk drive to read to and/or write from a removable, non-volatile magnetic disk, and an optical disk drive to read to and/or write from a removable, non-volatile optical disk, such as a CD-ROM or other optical media. Other removable/non-removable, volatile/non-volatile computer storage media that can be used in the computer system 100 to perform the functional steps associated with the system 10 and method of the present invention include, but are not limited to, magnetic tape cassettes, flash memory cards, digital versatile disks, digital video tape, solid state RAM, solid state ROM, and the like.

The drives and their associated computer storage media described above provide storage of computer readable instructions, data structures, program modules and other data for the computer processor 120. A user may enter commands and information into the computer processor 120 through input devices such as a keyboard 101 and a pointing device 102, commonly referred to as a mouse, trackball or touch pad. Other input devices (not shown) may include a microphone, joystick, game pad, satellite dish, scanner, or the like. These and other input devices are connected to the computer processor 120 through the system bus, or other bus structures, such as a parallel port, game port or a universal serial bus (USB), but is not limited thereto. A monitor 103 or other type of display device is also connected to the computer processor 120 through the system bus or other bus arrangement. In addition to the display 103, the computer processor 120 may be connected to other peripheral output devices, such as printers (not shown).

The computer processor 120 may be configured and arranged to perform functions and steps embodied in computer instructions stored and accessed in any one or more of the manners described. The functions and steps, such as the functions and steps of the system and method of the present invention to be described herein, individually or in combination, may be implemented as a computer program product tangibly as computer-readable signals on a computer-readable medium, such as any one or more of the computer-readable media described. Such computer program product may include computer-readable signals tangibly embodied on the computer-readable medium, where such signals define instructions, for example, as part of one or more programs that, as a result of being executed by the computer processor 120, instruct the computer processor 120 to perform one or more processes or acts described herein, and/or various examples, variations and combinations thereof. Such instructions may be written in any of a plurality of programming languages, for example, XML, Java, Visual Basic, C, or C++, Fortran, Pascal, python, Eiffel, Basic, COBOL, and the like, or any of a variety of combinations thereof. The computer-readable medium on which such instructions are stored may reside on one or more of the components described above and may be distributed across one or more such components.

It is to be noted that the system 10 may be accessed and used via any sort of information exchange interface through hardware devices including, for example, text/graphic scanner or reader inputs, touch-screen technology, voice recognition/synthesis equipment, other input/output devices, portable laptop, notebook, in-vehicle, or handheld personal digital assistant (PDA) portable computer devices, including those equipped for wireless communications, and telephony devices, such as wireless phones and IP-based phones.

Figure 3:
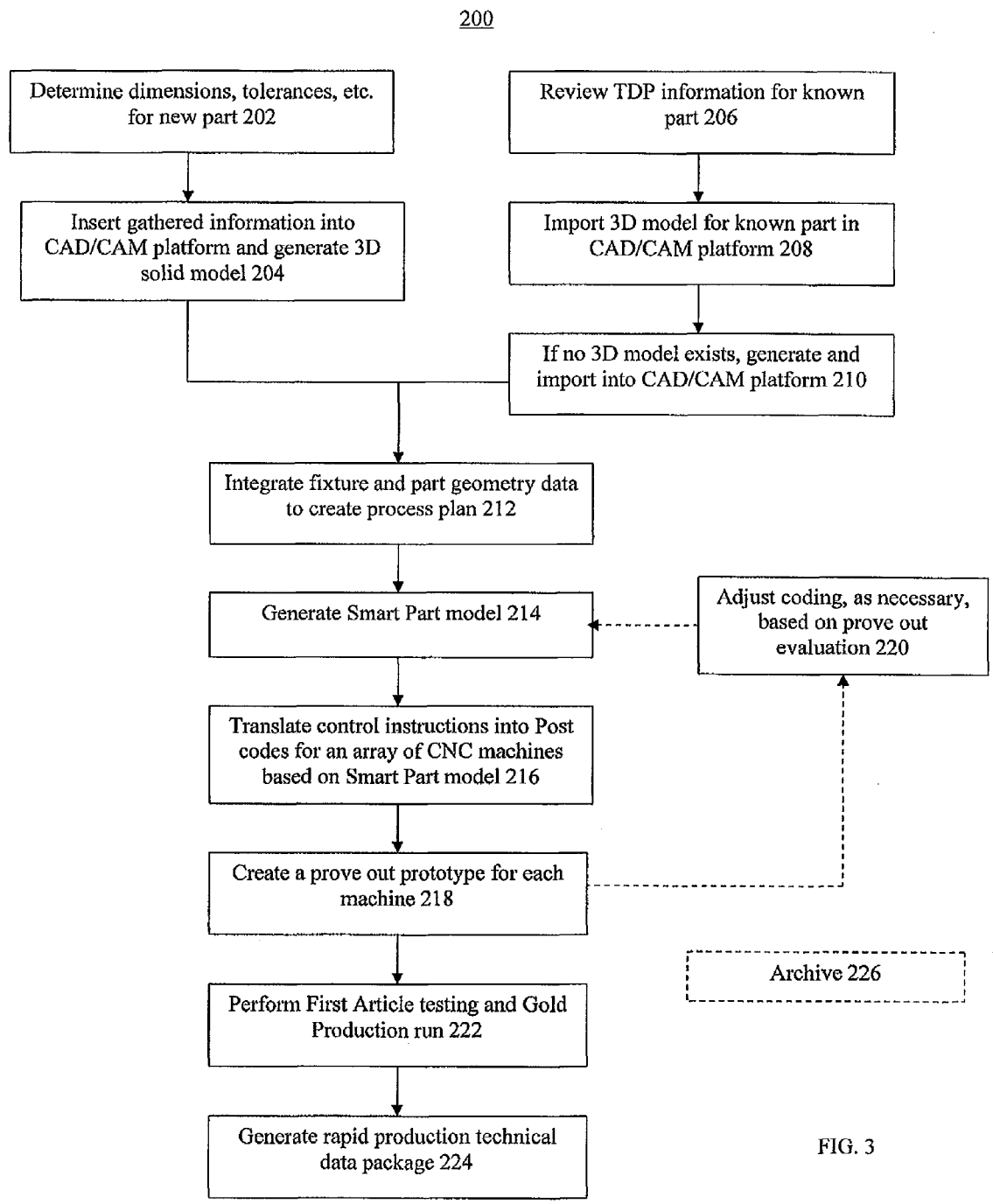
FIG. 3 is a simplified flow diagram representing the primary steps of the method of the present invention.

FIG. 3 provides a simplified block representation of the steps associated with the method of use of the system 10 of the present invention. It is to be understood that the steps described herein may be carried out through the identified functions of the system 10 as electronic functions performed through the computer system 100 based on computer programming steps. The functions configured to perform the steps described herein may be implemented in hardware and/or software. For example, particular software, firmware, or microcode functions executing on the computing devices can provide the design function 20, the fixture and tooling function 30, the machine selection function 40 and the configuration of the package 50. Alternatively, or in addition, hardware modules, such as programmable arrays, can be used in the devices to provide some or all of those functions, provided they are programmed to perform the steps described.

As illustrated in FIG. 3, a method to provide a turnkey package for rapid production of a product, method 200, includes several steps for the effective manufacture of a part. In step 202, if the part is an original one for which no prior samples, designs or manufacturing instructions are provided, the dimensions, tolerances, materials and packaging for the part are determined. In step 204, the gathered information about the new part is inserted into a single CAD/CAM platform to generate a three-dimensional solid model for part and fixture model file creation. In step 206, if the part has already been designed, and there is an existing Technology Data Package (TDP) of some form, that TDP is reviewed. The existing TDP may include a wide range of information or a limited amount of information. In step 208, if the existing TDP includes a three-dimensional solid model file, that model is imported into the single CAD/CAM platform of the system 10, regardless of format. The method 200 includes the step of adjusting the tolerances for the part to program machining to make the part at the middle of the tolerance range at the time of introduction of the existing model into the CAD/CAM platform 10. In step 210, if the existing TDP does not include a three-dimensional solid model file, the existing part is either scanned and then modeled or rendered into a three-dimensional model from two-dimensional drawings, such as blueprints, for example. The rendered three-dimensional model is generated as a part and fixture file of the single CAD/CAM platform, as with the creation of the model file for a new part, represented by step 204.

The single CAD/CAM platform is a computer program configured to store data, files and computations. The platform is further configured to operate in collaboration with the database 130 to retain, gather, and distribute design, fixtures, tooling, machine and any other relevant advanced technology information associated with parts machining. In step 212, the platform is used to integrate fixture geometry and part geometry data to generate a part fabrication process plan. The platform performs that integration through computer programming that translates, as applicable, the configuration of the part to establish one or more best fits with the geometry of an existing fixture or one that may be generated. Those of skill in the art will recognize how to implement such integration. In step 214, the method 200 generates a "Smart Part" model for the fabrication of the desired part using any CNC machine for which information and controller instructions exist in the database 130 and/or the platform. The Smart Part model is a computer program comprising correlations between part dimensions, fixture and tooling designations and packaging and the controls for all CNC machines represented in the database 130. In step 216, the controls are translated into Post codes G and M for any CNC machine of interest, and may included embedded standard and/or custom parametric scripts suitable for those machines. An example of the Post coding correlation capability with parametric script embedding is described in the parent application incorporated herein by reference.

With continuing reference to FIG. 3, the established G and M post codes and related information associated with the fabrication of the part are used to generate a prove out prototype of the part for each CNC machine in step 218 using the fixtures and tooling identified as most suitable for the particular machine. Any machine crash errors, parts geometry errors and tolerance errors are detected and, if necessary, the Smart Part model, which may include setup, run, fixture and/or tooling, or a portion thereof, is adjusted with respect to one or more of the machines of the database 130, step 220. Once prove out has been completed, First Article testing and Gold Part production runs are performed, step 222, for each CNC machine. A First Article certificate is then established and the Smart Part model and associated G and M Post codes are incorporated into the rapid production technical data package 50, step 224. Optionally, the method 200 includes the steps of archiving any Smart Part model, any revisions made in the course of creating that model, and any subsequent revisions made after production runs begin, step 226. Such file storage may occur in the database 130 but is not limited thereto.

The rapid production turnkey package 50 includes: 1) the First Article certificate; 2) a complete and proven process plan, including a three-dimensional solid model, setup and process instructions, and machine-specific G and M codes with optional embedded advanced macro parametric scripts; 3) machine-specific work holding fixtures, which may be adapted to fit many similar machine configurations; 4) actual cutting tools that produce the part, whether special form tools or industry standard, whichever is most effective at making the part; and 5) revision control means, which may be in the form of a computer program compatible with data storage. The package 50 is configured with sufficient flexibility to enable conversion of the G and M codes of one machine to the G and M codes of a different machine as a way for the manufacturer to use existing equipment to meet a surge in demand, for example, by simply re-designating the CNC machine for which the Post codes, fixtures and tooling are needed.

As those of skill in the art know, revisions to plans, process, materials and the like are often desirable to improve the product to be made. It is important to capture any changes or revisions made as part of the effective quality control of the system 10 of the present invention. Generally speaking, a revision a request that alters or deviates from the initial production package after the initial package is developed, tested and proven. Revisions are implemented through the present invention as a collaboration between the organization requesting a change and the organization(s) responsible for ensuring compliance with the process described herein. For considerable changes to be made to a production package, the organization requesting the changes must also be notified of additional lead time requirements to update the complete turn key package. In an embodiment of the revision control means of the present invention, every change order becomes a new turn key production package that must be tested, proven, and first article documented. Those steps must take place before archiving the new revised process. Some further note's:

In an embodiment of the system 10, the latest cutting tool technology information will be incorporated into the package 50 to bring the cutting parameters and the method of the process up to date. Every request for an "Engineering Change Order" (ECO) is considered a change to the previous clean and archived turn key production package 50. An ECO may comprise changes, for example, to dimensional specifications, new material requirements, new Military Specifications, or new Aerospace regulations. Every ECO is considered in the revisions control mechanism of the invention to be a REV level change, and noted in all technical data package documentation, along with past REV level changes and part history. All REV level changes are archived and stored for reference, history, and for legacy parts that require older revised parts to be produced. All data is archived as described herein. For example, the SupplyPoint® program identified herein may be used for that purpose.

The manufacturer that has obtained a rapid production technical data package 50 need only designate the part and the CNC machine to use. The package 50 will provide the designated coding for that machine, with First Article certificate already available. The process associated with the method 200 of the present invention may reduce the time involved from initial part idea to production to a range of one week to four months, which is substantially shorter than the existing process for part machining.

It is to be understood that various modifications may be made to the system 10 and related method 200 without departing from the spirit and scope of the invention. Accordingly, other embodiments are within the scope of the claims appended hereto.

What is claimed is:

1. A method to increase efficiency in the manufacture of a part using a CNC machine, the method comprising the steps of:
   a. establishing a database of information about a plurality of CNC machines available from a plurality of CNC machine manufacturers;
   b. gathering information about the part;
   c. incorporating the information about the part as a three-dimensional model into a CAD/CAM platform;
   d. integrating machine fixture and part geometry information together in the CAD/CAM platform;
   e. generating a process plan based on the integrating step;
   f. generating a model for the part applicable to each of the plurality of CNC machines of the database including Post codes for the CNC machines; and
   g. creating a rapid production technical data package for manufacture of the part by a particular manufacturer based on that particular manufacturer's manufacturing capabilities, wherein the technical data package includes Post codes for the operation of any selectable ones of the CNC machines of the database.

2. The method as claimed in claim 1 wherein the step of generating a model includes the step of generating G and M Post codes for each of the plurality of CNC machines of the database.

3. The method as claimed in claim 2 further comprising the step of performing a prove out of the generated G and M Post codes prior to finalizing the rapid production technical data package.

4. The method as claimed in claim 2 wherein the G and M Post codes include embedded parametric scripts.

5. The method as claimed in claim 1 wherein the part is a new part and the step of gathering information about the part includes the step of determining dimensions, tolerances, material and packaging for the part.

6. The method as claimed in claim 5 further comprising the step of generating a three-dimensional solid model for the part.

7. The method as claimed in claim 1 wherein the part is an existing part and the step of gathering information includes the step of reviewing any existing technical data package for the part.

8. The method as claimed in claim 7 further comprising the steps of importing an existing three-dimensional solid model file for the part into the CAD/CAM platform and normalizing any designated tolerances for the part.

9. The method as claimed in claim 1 wherein the step of generating the model includes the step of designing the model for best manufacturability.

10. The method as claimed in claim 1 wherein the rapid production technical data package includes:
    a. a First Article inspection certificate;
    b. a process plan including a three-dimensional solid model, setup and process instructions and machine-specific G and M Post codes;
    c. machine-specific work holding fixtures;
    d. cutting tools; and
    e. means for revision control.

11. The method as claimed in claim 1 wherein the step of generating the model includes the step of selecting one of the plurality of CNC machines of the database as the best machine for the particular manufacturer to manufacture the part.

12. The method as claimed in claim 1 wherein the database includes:
    a. automatic part feature recognition;
    b. automatic tool selection;
    c. Post processing files for a plurality of CNC machines; and
    d. embedded macro parametric scripts.

13. A system to increase efficiency in the manufacture of a part using a CNC machine, the system comprising:
    a. a design function configured to receive information about the part and to modify, amend and/or add to such information and to transmit part manufacturing information consistent with a particular manufacturer's fabrication capabilities;
    b. a fixtures and tooling function configured to receive fixture and tooling information, and to modify, amend and/or add to such information, and to transmit such information for use in part manufacturing;
    c. a machine selection function configured to receive CNC machine information, and to modify, amend and/or add to such information in relation to the design function and the fixtures and tooling function, and to transmit such information for use in part manufacturing;
    d. a rapid production technology data package including a compilation of instructions and information supplied to the particular manufacturer to be used in the production of the part; and
    e. a database of information about a plurality of CNC machines available from a plurality of CNC manufacturers, wherein the database includes the CNC machine information.

14. The system as claimed in claim 13 wherein the database includes:
    a. automatic part feature recognition;
    b. automatic tool selection;
    c. Post processing files for the plurality of CNC machines; and
    d. embedded macro parametric scripts.

15. The system as claimed in claim 13 wherein the rapid production technology data package includes:
    a. a First Article inspection certificate;
    b. a process plan including a three-dimensional solid model, setup and process instructions and machine-specific G and M Post codes;
    c. machine-specific work holding fixtures;
    d. cutting tools; and
    e. means for revision control.

16. The system as claimed in claim 15 wherein the G and M Post codes include embedded parametric scripts.

* * * * *